H. NAKAMIZO.
AUTOMOBILE TOP RAISING AND LOWERING DEVICE.
APPLICATION FILED FEB. 27, 1917.
1,279,410.
Patented Sept. 17, 1918.
2 SHEETS—SHEET 1.
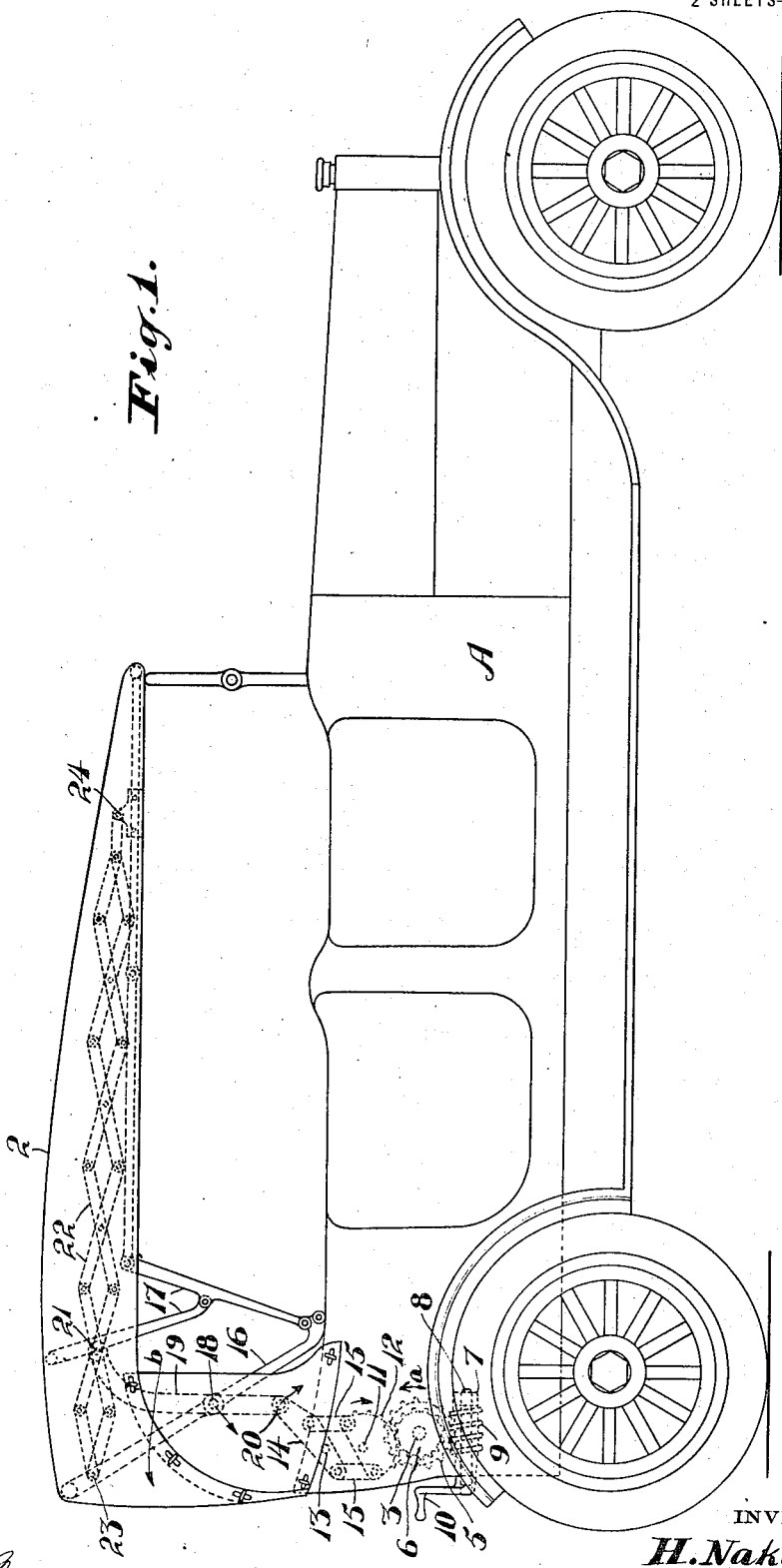
WITNESSES:
INVENTOR
H. Nakamizo,
ATTORNEYS H. NAKAMIZO.
AUTOMOBILE TOP RAISING AND LOWERING DEVICE.
APPLICATION FILED FEB. 27, 1917.
1,279,410.
Patented Sept. 17, 1918.
2 SHEETS—SHEET 2.
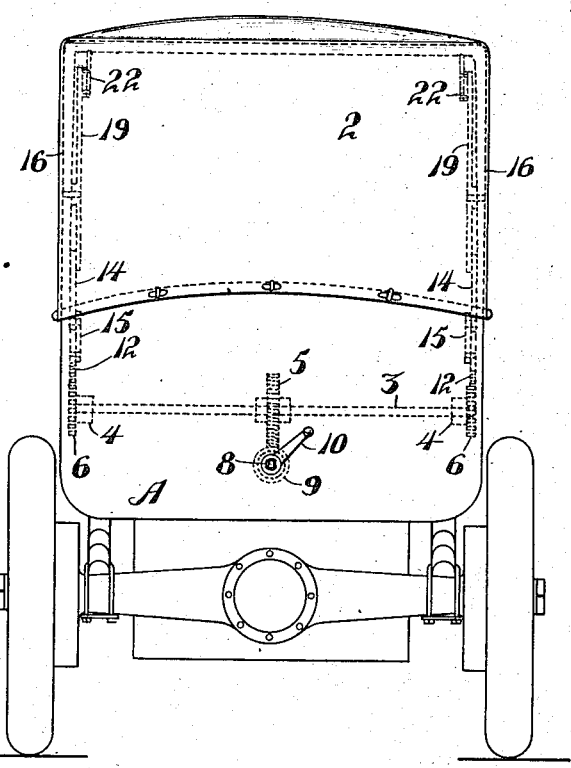
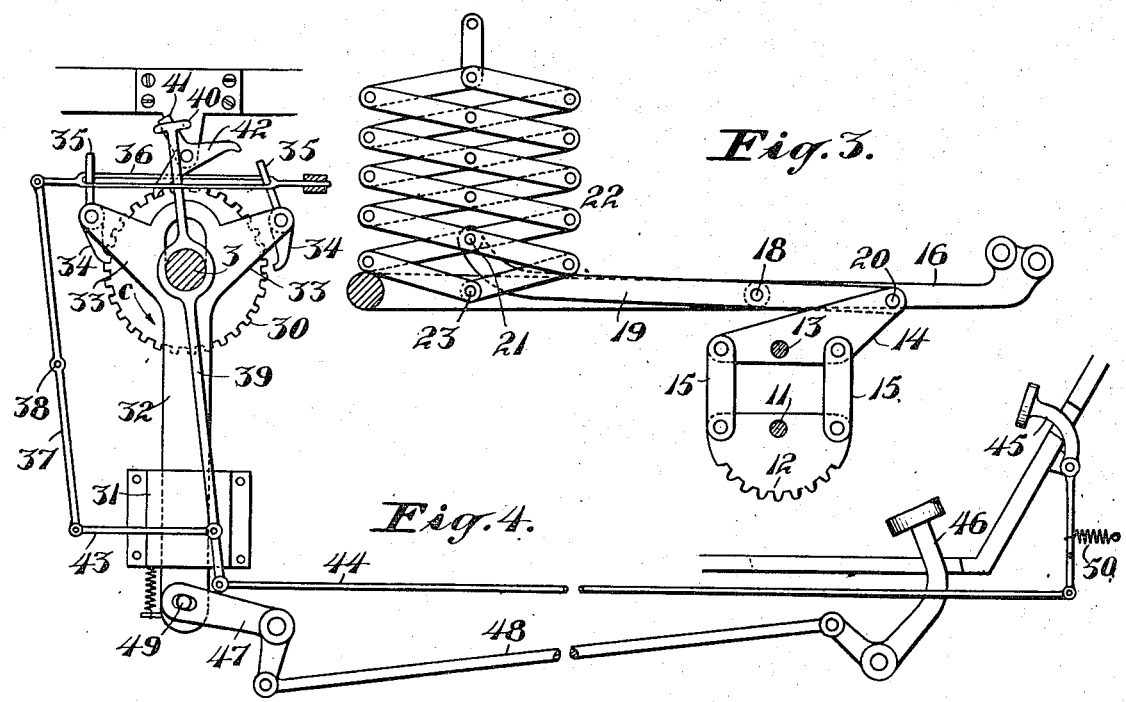
WITNESSES:
INVENTOR
H. Nakamizo,
BY
ATTORNEYS

UNITED STATES PATENT OFFICE.

HIROTSUNE NAKAMIZO, OF LOS ANGELES, CALIFORNIA.

AUTOMOBILE-TOP RAISING AND LOWERING DEVICE.

1,279,410. Specification of Letters Patent. Patented Sept. 17, 1918.

Application filed February 27, 1917. Serial No. 151,180.

*To all whom it may concern:*

Be it known that I, HIROTSUNE NAKAMIZO, a subject of the Emperor of Japan, residing at Los Angeles, in the county of Los Angeles and State of California, have invented new and useful Improvements in Automobile-Top Raising and Lowering Devices, of which the following is a specification.

This invention relates to an automobile top raising and lowering device.

It is an object of the present invention to provide a simple, substantial, easily applied attachment for automobile tops which makes it possible for one individual to raise or lower the top without assistance. Further objects will hereinafter appear.

The invention consists of the parts and the construction and combination of parts as hereinafter more fully described and claimed, having reference to the accompanying drawings, in which—

Figure 1 is a side elevation of an automobile, showing the application of the invention.

Fig. 2 is an end view of same.

Fig. 3 is a side elevation of the raising and lowering attachment showing it in the collapsed or folded position.

Fig. 4 is a side elevation, showing a modification of the operating mechanism.

Referring to the drawings, A indicates, in general, an automobile and 2 the top. Extending crosswise of the car, preferably under the rear seat, is a shaft 3 supported in journals 4, on which is secured a worm gear 5 and a pair of spur gears 6. The spur gears are secured one on each end of the shaft, while the worm gear is positioned approximately central between same. Supported in journals 7, at right angles to shaft 3, is a shaft 8, carrying a worm 9 which is in constant mesh with the worm gear 5. The upper end of the shaft 8 extends through the rear body portion of the car and is preferably square in cross section to permit the application of a hand crank 10.

Suitably secured in each side of the automobile is a stud shaft 11, and pivotally mounted on each stud is a mutilated spur gear 12; each spur gear 12 being in constant mesh with a gear 6. Pivotally mounted, as at 13, above the stud shafts 11 and in approximate alinement with same is a lever 14 which is connected with the mutilated gear 12 by means of a pair of parallel arms 15.

The top proper is constructed in any suitable manner, but is preferably provided with a main supporting bow 16 and any number of secondary bows, such as shown at 17. Pivotally mounted, as at 18, on each side of the main bow is an arm 19; the lower end of each arm 19 being pivotally connected, as at 20, to a lever 14, while the upper end of each arm is pivotally connected, as at 21, to a lazy tong structure, generally indicated at 22, there being one set of lazy tongs inside of the main cover on each side. Each set of said lazy tong arms is pivotally connected at their rear ends, as at 23, to the main bow 16, while the forward ends are pivotally connected, as at 24, to the forward end of the top.

From the foregoing description it will be seen that there is one spur gear 6, an intermeshing mutilated spur gear 12, a pair of parallel arms 15, a lever 14 and an arm 19 and one set of lazy tong arms on each side of the cover or top structure, each set being operated in unison to raise or lower the top by means of the central worm gear train which is operated by the hand crank 10.

In operation, with the cover extended as shown in Fig. 1, it is only necessary to apply the hand crank 10 and turn the same to cause the worm gear 5 to turn in the direction of arrow *a*. This will cause one of the parallel arms 15 to pull one side of the lever 14 in a downward direction and the opposite end in an upward direction, thereby pulling the arms 19 and the main bow 16 in a downward direction. The arms 19 will at the same time swing about their pivots in the direction of arrow *b* and will, therefore, cause the lazy tong arms to fold or pull the cover section of the top back from the main front support. Continued turning movement of the crank will finally completely fold and lower the top: the lazy tong structure, with connected arms and links, when thus lowered assuming the position shown in Fig. 3. To raise the top it is only necessary to turn the crank in the opposite direction, the same cycle of operation taking place, the only difference being that the arms and links will reverse their movement.

The worm wheel 12 and worm 9 permit the mechanism as a whole to be easily operated, and as it requires practically no power to turn the crank 10, it is obvious that any person, whether young or old, can operate the mechanism.

By referring to Fig. 4 a modification of the worm gear mechanism shown in Figs. 1 and 2 is shown. As previously described, it is only necessary to turn the main shaft 3 in one direction or the other to raise or lower the top. This is accomplished by the mechanism shown in Fig. 4 in the following manner: Secured upon the shaft 3 in the same position formerly assumed by the worm gear 5 is a ratchet gear 30. Straddling the shaft 3 and slidably mounted in a bearing bracket 31 is a yoke frame 32, the upper end of which is provided with outwardly extending arms 33.

Pivotally mounted in each arm 33 is a pawl 34, and extending upwardly from each pawl is an arm 35 which is adapted to be engaged by a slidably mounted yoke 36. Pivotally connected to one end of said yoke is an arm 37 which is pivotally supported on one side of the main yoke 32, as at 38. Pivotally mounted on the shaft 3 is an arm 39, the upper end of which is fork-shaped, as at 40, to engage an upwardly extending arm 41 of a pivotally mounted double pawl 42. Pivotally connecting the arms 39 and 37 is a link 43 which causes the arms to move in unison; and connected with the lower end of arm 39 is a rod 44 which is connected with a foot treadle 45 to permit the arms to be moved at will by the operator.

Mounted adjacent to the foot treadle 45 is a second food treadle 46, and connecting the lower end of said treadle 46 with a bellcrank 47 is a rod 48; the lower end of the main yoke 32 being connected with the bellcrank 47, as at 49. The foot treadles 45 and 46 are positioned on the dashboard of the car and thus make it possible for the operator to raise or lower the top without stepping out of the car or leaving the seat.

The operation will be as follows: If it is desired to turn the shaft 3 in the direction of arrow $c$, it is only necessary to lift the foot treadle 45 in the position shown, said foot treadle being held in the position shown by means of the spring 50. The foot treadle in this position holds the arms 39 and 37 in the position shown in Fig. 4 and, therefore, causes the yoke frame 36 to hold one of the pawls 34 out of engagement with the ratchet wheel and the opposite pawl in engagement. The fork-shaped upper end of the lever 39 at the same time supports the double pawl 42 in the position shown. The foot treadle 46, when depressed, will pull the main yoke frame 32 in a downward direction and will cause the pawl 34 to engage the teeth of the ratchet and turn the same, together with the shaft 3, in the direction of arrow $c$. To turn the shaft in the opposite direction it is only necessary to depress the foot treadle 45. This will cause the opposite set of pawls to engage the ratchet wheel and will also cause said ratchet wheel and the shaft 3 to revolve in an opposite direction when the foot treadle 46 is depressed; the turning movement of the shaft 3, as before described, causing the spur gears 6 to operate the raising and lowering mechanism, as previously described.

The modified structure shown in Fig. 4 may be installed, if desired, to take the place of the worm gear mechanism shown in Fig. 1 and may in some instances be desirable as it permits the operator of the car to raise or lower the top without leaving the front seat.

The materials and finish of the several parts of the mechanism are such as the experience and judgment of the manufacturer may dictate.

I wish it understood that various changes in form, proportions and minor details of construction may be resorted to within the scope of the appended claims, and that I do not wish to limit myself to the specific design and construction here shown.

Having thus described my invention, what I claim and desire to secure by Letters Patent is—

1. A top raising and lowering device comprising a lazy tong frame, a bow to which the rear end of the frame is connected, the forward end of the frame being connected to the front portion of the top, an arm pivoted between its ends to the bow and connected at its upper end to the pivotal cross connection between two levers of the lazy tong frame and means for swinging the lower end of the arm.

2. A top raising and lowering device comprising a lazy tong frame, a bow to which the rear end of the frame is connected, the forward end of the frame being connected to the front portion of the top, an arm pivoted between its ends to the bow, and connected at its upper end to the lazy tong frame, a lever pivoted between its ends and connected at one end to the lower end of the arm for swinging the same, a rockable member, and a pair of links connecting the latter to the lever on opposite sides of its pivotal mounting for rocking the lever.

3. The combination with the main and secondary bows and the folding arms supporting a vehicle top, of an arm pivotally mounted on each side of the main bow, a pair of lazy tong frames secured at the rear ends, one on each side of the main bow and at their opposite ends to the front end of the top, a pivotal connection between the upper end of each arm and each lazy tong frame, means for raising and swinging said arms in unison, said means comprising a shaft, means for turning said shaft in either direction, a gear secured on each end of the shaft, a mutilated gear intermeshing with each gear, a pivotally mounted lever adjacent to each mutilated gear, each of said levers being pivotally connected at their upper ends to the lower ends of the arms, and a pair of parallel links connecting each mutilated gear and lever.

4. The combination with the main and secondary bows and the folding arms supporting a vehicle top, of a pair of lazy tong frames connected at their rear ends to the main bow and at their opposite ends to the forward folding arms, means for extending or folding the lazy tongs in unison to extend or fold the top, said means comprising a pair of arms pivotally mounted on the main bow and connected at their upper ends with the lazy tong frames in advance of the connection of the latter to the main bow, and means connected with the lower ends of said arms for raising the arms and the bow in unison and also adapted to simultaneously impart a swinging movement to the arms to extend the lazy tong frames.

5. The combination with the main and secondary bows and the folding arms supporting a vehicle top, of a pair of lazy tong frames connected at their rear ends to the main bow and at their opposite ends to the front folding arms, a pair of arms pivotally mounted on the main bow above its mounting and connected at their upper ends with the lazy tong frames, a pair of levers pivotally mounted on the vehicle body supporting the vehicle top, said levers being pivotally connected at one end to the lower ends of the arms and at their opposite ends to a turnable member, and means for turning said member in either direction to raise or lower the top.

6. A top raising and lowering device comprising a lazy tong frame, a bow to which the rear end of the frame is connected, the forward end of the frame being connected to the front portion of the top, an arm pivoted between its ends to the bow and connected at its upper end to the lazy tong frame, a lever pivoted between its ends and connected at one end to the lower end of the arm for swinging the same, a gear connected to the lever for rocking it, and foot-operated means for rotating the gear.

7. A top raising and lowering device comprising a lazy tong frame, a bow to which the rear end of the frame is connected, the forward end of the frame being connected to the front portion of the top, an arm pivoted between its ends to the bow and connected at its upper end to the lazy tong frame, and means for swinging the lower end of the arm, including a ratchet gear, a slidable yoke frame having outwardly extending arms, a pawl pivoted in each yoke arm for engaging the ratchet gear on sliding the yoke frame, and means for holding one pawl idle when the other is operative.

8. A top raising and lowering device comprising a lazy tong frame, a bow to which the rear end of the frame is connected, the forward end of the frame being connected to the front portion of the top, an arm pivoted between its ends to the bow and connected at its upper end to the lazy tong frame, and means for swinging the lower end of the arm including a ratchet gear, a slidable yoke frame having outwardly extending arms, a pawl pivoted in each yoke arm for engaging the ratchet gear on sliding the yoke frame, a double, locking pawl engageable with the gear to hold it from retrograde movement, and means for sliding the yoke frame and disposing the locking pawl operative relative to the operating first pawl.

9. A top raising and lowering device comprising a lazy tong frame, a bow to which the rear end of the frame is connected, the forward end of the frame being connected to the front portion of the top, an arm pivoted between its ends to the bow and connected at its upper end to the lazy tong frame, and means for swinging the lower end of the arm including a ratchet gear, a slidably guided Y-shaped yoke, a pawl pivoted in each yoke arm for engaging and operating the ratchet gear, and means for reciprocating the yoke to operate the ratchet for raising and lowering the top.

10. A top raising and lowering device comprising a lazy tong frame, a bow to which the rear end of the frame is connected, the forward end of the frame being connected to the front portion of the top, an arm pivoted between its ends to the bow and connected at its upper end to the lazy tong frame, and means for swinging the lower end of the arm including a ratchet gear, a slidably guided Y-shaped yoke, a pawl pivoted in each yoke arm for engaging and operating the ratchet gear, each pawl having an extension, means engaging the pawl extensions to effect engagement of one pawl with the ratchet gear and simultaneous disengagement of the other pawl therefrom, and means for reciprocating the ratchet gear.

11. A top raising and lowering device comprising main and secondary bows, forwardly extendible folding arms the rear arms of which are connected to the secondary bow, a pair of lazy tongs connected at the forward end to the front foldable arms and pivoted at the opposite end to the main bow for swinging vertically about a horizontal pivot, and an operating lever pivoted between its ends to the main bow for swinging in a vertical plane about a horizontal pivot and having its upper end extending forwardly of the pivotal mounting, when the top is operative, and connected to the lazy tongs for swinging in an upward arc when the lower end is operated.

In testimony whereof I have hereunto set my hand in the presence of two subscribing witnesses.

HIROTSUNE NAKAMIZO.

Witnesses:
 JOHN H. HERRING,
 W. W. HEALEY.